United States Patent
Tsantker et al.

[11] 3,869,251
[45] Mar. 4, 1975

[54] APPARATUS FOR INTERMIXING MATERIALS IN A REACTION VESSEL CONTAINING FERROMAGNETIC PARTICLES

[76] Inventors: Karl Lazarevich Tsantker, ulitsa Gogolya, 19, kv.4; Dmitry Danilovich Logvinenko, ulitsa Kalinina, 5, kv.5; Oleg Parfirovich Shelyakov, ulitsa Kalinina, 5, kv.100; Vadim Pavlovich Verich, ulitsa Frunze, 106-a, kv.16; Alexandr Vasilievich Skrypnik, Kievskoe shosse, 78, kv.23, all of Poltava; Nikolai Ivanovich Shishkov, ulitsa Karla Marxa, 22, kv.78, Dnepropetrovsk, all of U.S.S.R.

[22] Filed: May 14, 1973

[21] Appl. No.: 359,889

Related U.S. Application Data
[63] Continuation of Ser. No. 200,824, Nov. 22, 1971, abandoned.

[52] U.S. Cl. .................. 23/252 R, 23/285, 259/1, 259/DIG. 46, 336/136, 204/155
[51] Int. Cl. .................................... B01j 1/00
[58] Field of Search .............. 23/252 R, 285; 259/DIG. 46, 1; 204/155; 336/136; 219/10.75, 10.79

[56] References Cited
UNITED STATES PATENTS

| | | | |
|---|---|---|---|
| 2,363,994 | 11/1944 | Richter | 219/10.79 X |
| 3,219,318 | 11/1965 | Hershler | 259/DIG. 46 |
| 3,439,899 | 4/1969 | Hershler | 259/1 R |

*Primary Examiner*—James H. Tayman, Jr.
*Attorney, Agent, or Firm*—Holman & Stern

[57] ABSTRACT

An apparatus for intermixing materials in a vortex bed of ferromagnetic particles comprising a reaction vessel with ferromagnetic particles contained therein, a rotating electromagnetic field inductor disposed in embracing relationship with the reaction vessel and means for reciprocating the reaction vessel and the inductor in relation to each other and at right angles to the vector of the rotating electromagnetic field.

6 Claims, 1 Drawing Figure

PATENTED MAR 4 1975 3,869,251
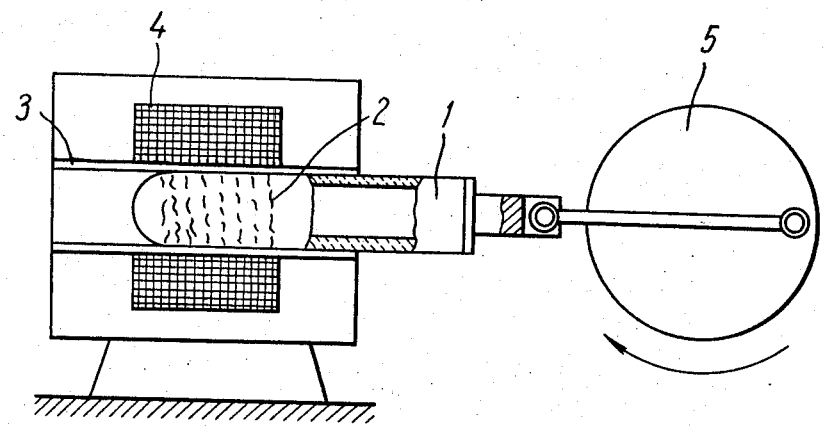

3,869,251

APPARATUS FOR INTERMIXING MATERIALS IN A REACTION VESSEL CONTAINING FERROMAGNETIC PARTICLES

This is a continuation, of application Ser. No. 200,824, filed Nov. 22, 1971 and now abandoned.

BACKGROUND OF THE INVENTION

This invention relates to equipment for carrying out physical and chemical processes and, more particularly, to apparatus for conducting physical and chemical processes involving the use of electromagnetic fields. The apparatus, according to the present invention, is intended primarily for processing loose materials.

There is known an apparatus for carrying out physical and chemical processes in a vortex bed of ferromagnetic particles which comprises a reaction vessel fabricated from a non-magnetic or feebly magnetic material and containing ferromagnetic particles, and an inductor that embraces said reaction vessel and produces therein a rotating electromagnetic field. The feed stock, e.g., materials to be reacted or intermixed thoroughly, is charged into the reaction vessel together with a definite amount of ferromagnetic particles, violent rotational and translational motion being imparted to said ferromagnetic particles by the rotating electromagnetic field. This type of movement of ferromagnetic particles in the reaction vessel provides for intermixing vigorously the feed stock or comminuting solid materials to a particle size as small as a few hundredths of a micron.

The vortex bed of ferromagnetic particles formed under the effect of the inductor is disk-shaped, said disk being of a rather moderate width and intermixing the feed stock occurring in the apparatus only in the zone of inductor action. The fact that in the known apparatus it is impracticable to distribute the materials being processed uniformly throughout the entire volume of the reaction vessel, particularly so in the case of loose feed stock mixing, results in a diminishing of the throughput capacity of the apparatus and is also responsible for local wear of the reaction vessel and for the necessity of replacing frequently the worn out reaction vessel.

It is impractical to attempt to mitigate or eliminate said disadvantages by providing in the apparatus a rotating electromagnetic field inductor whose working zone embraces the entire volume of the reaction vessel, since this route involves prohibitively high electric power requirements.

SUMMARY OF THE INVENTION

An object of the present invention is the provision of an apparatus for carrying out physical and chemical processes in a vortex bed of ferromagnetic particles, in which apparatus reaction vessel wear will be uniform throughout the entire length of the reaction vessel, thereby prolonging the service life of the reaction vessel, and the feed stock being intermixed will move throughout the entire reaction vessel volume, thereby making for improved mixing and a higher apparatus throughput capacity.

This object is accomplished by an apparatus for carrying out physical and chemical processes in a vortex bed of ferromagnetic particles, which comprises a reaction vessel containing said ferromagnetic particles and a rotating electromagnetic field inductor that embraces said reaction vessel wherein, according to the invention, in the apparatus provision is made for reciprocating said reaction vessel and said rotating electromagnetic field inductor in relation to each other in a direction at right angles to the rotating electromagnetic field vector.

Reaction vessel travel relative to the zone of electromagnetic field effects is conducive to increase the throughput capacity of the apparatus of the present invention and also to increase the service life of the reaction vessel.

BRIEF DESCRIPTION OF THE DRAWING

The present invention is illustrated hereinbelow by the description of an exemplary embodiment thereof with reference to the accompanying Drawing, which presents an apparatus bed of ferromagnetic particles, according to the invention.

DETAILED DESCRIPTION OF THE PREFERRED EMBODIMENT

The apparatus for conducting physical and chemical processes in a vortex bed of ferromagnetic particles comprises a reaction vessel 1 with ferromagnetic particles 2 contained therein, a guide bushing 3, a rotating electromagnetic field inductor 4, and a crank and connecting rod assembly 5, which effects the displacement of the reaction vessel 1 in relation to the rotating electromagnetic field inductor 4.

The crank and connecting rod assembly may be replaced with a suitable mechanical, electromechanical, pneumatic or hydraulic mechanism, which causes the reaction vessel 1 to reciprocate or alternatively, where said reaction vessel is fixed rigidly in place, a mechanism which sets the inductor 4 in reciprocating motion.

The present apparatus functions as follows:

The feed stock, e.g., materials to be reacted chemically or mixed thoroughly, is charged into the reaction vessel 1, which is caused by the crank and connecting rod assembly 5 to travel along the guide bushing 3 in the zone of the rotating electromagnetic field produced by the inductor 4.

The reaction vessel 1 also contains a definite amount of non-equiaxial ferromagnetic particles 2, e.g., steel particles, which are set in vigorous rotational and translational movement (the ferromagnetic particles 2 rotate about both their axes and the axis of the reaction vessel 1) by the rotating electromagnetic field generated by the inductor 4. The above-identified type of ferromagnetic particle movement provides for intermixing vigorously the feed stock charged in the reaction vessel 1 and disposed in the zone of the rotating electromagnetic field. When the inductor 4 and the reaction vessel 1 are set in reciprocating motion in relation to each other, the ferromagnetic particles 2 retained in the zone of the electromagnetic field move along the axis of the reaction vessel 1, thereby providing for intermixing vigorously the feed stock not only in a limited volume of the reaction vessel 1, said volume being confined by the electromagnetic field zone of action, but throughout the entire volume of the reaction vessel 1. Hence, in the reciprocating reaction vessel of the apparatus, according to the present invention, the feed stock charge is several times as great as that in the reaction vessel of the prior art apparatus, so that the time required for charging the feed stock and discharging the reaction products is minimized and the throughout capacity of the present apparatus is accordingly several times as great as that of conventional apparatus.

In the present apparatus, the zone of ferromagnetic particle movement is displaced uniformly along the reaction vessel 1 and the construction material of said vessel undergoes uniform wear over the entire vessel length, with the result that the service life of the reaction vessel 1 will be greater than that of the prior art apparatus.

When the present apparatus is used for carrying out mixing operations, e.g., the mixing of loose pulverulent materials, the uniformity of mixture component distribution is as high as 97–100 percent.

We claim:

1. An apparatus for handling materials comprising: a working vessel adapted to contain the materials being handled; a plurality of ferromagnetic particles located in said working vessel; stationary means embracing the working vessel for generating inside said vessel a rotary electromagnetic field involving said working vessel and said material being handled in order to cause said ferromagnetic particles to rotate and reciprocate and to retain said particles in the effective region of the magnetic field; and means for reciprocating said working vessel along its axis relative to the stationary means for generating said rotary electromagnetic field.

2. The apparatus of claim 1, wherein a circular inductor having a poly-phase system of windings is employed to generate the rotary electromagnetic field.

3. The apparatus of claim 1 wherein said ferromagnetic particles rotate about both their axes and the axis of the reaction vessel.

4. An apparatus for handling materials comprising: a stationary workng vessel adapted to contain the materials being handled; a plurality of ferromagnetic particles located in said working vessel; means embracing the working vessel for generating inside said vessel a rotary electromagnetic field involving said working vessel and said material being handled in order to cause said ferromagnetic particles to rotate and reciprocate and to retain said particles in the effective region of the magnetic field; and means for reciprocating said means for generating said rotary electromagnetic field along its axis relative to the stationary working vessel.

5. The apparatus of claim 4, wherein a circular inductor having a poly-phase system of windings is employed to generate the rotary electromagnetic field.

6. The apparatus of claim 4 wherein said ferromagnetic particles rotate about both their axes and the axis of the reaction vessel.

* * * * *